United States Patent [19]

Oishi et al.

[11] Patent Number: 4,688,127
[45] Date of Patent: Aug. 18, 1987

[54] MAGNETIC RECORDING DISK CARTRIDGE WITH LOCKING MEMBER

[75] Inventors: Kengo Oishi; Tuyoshi Ono, both of Odawara, Japan

[73] Assignee: Fuji Photo Film Co., Ltd., Kanagawa, Japan

[21] Appl. No.: 512,753

[22] Filed: Jul. 11, 1983

[30] Foreign Application Priority Data

Jul. 16, 1982 [JP] Japan .................. 57-107699[U]

[51] Int. Cl.$^4$ .......................................... G11B 23/033
[52] U.S. Cl. .................................... 360/132; 360/133; 360/77.2; 360/291; 360/292
[58] Field of Search .................. 360/60, 97–99, 360/132, 133; 369/291–292, 77.2; 206/303, 309, 444; 346/137

[56] References Cited

U.S. PATENT DOCUMENTS

| | | | |
|---|---|---|---|
| 3,282,589 | 11/1976 | Morrison | 369/291 X |
| 3,730,602 | 5/1973 | Campbell et al. | 206/309 X |
| 3,931,640 | 1/1976 | Takahara et al. | 360/99 X |
| 3,951,264 | 4/1976 | Heidecker et al. | 360/60 X |
| 4,063,292 | 12/1977 | Karsh | 360/60 |
| 4,084,200 | 4/1978 | Adair et al. | 360/60 X |
| 4,084,690 | 4/1978 | Pulse | 206/444 X |
| 4,152,739 | 5/1979 | DeMoss et al. | 360/133 X |
| 4,343,546 | 8/1982 | Urquhart | 360/99 X |
| 4,488,190 | 12/1984 | Oishi et al. | 360/133 X |
| 4,489,407 | 12/1984 | Kiguchi | 369/77.2 |

Primary Examiner—Robert L. Richardson
Assistant Examiner—Wayne R. Young
Attorney, Agent, or Firm—Gerald J. Ferguson, Jr.; Michael P. Hoffman; Ronni S. Malamud

[57] ABSTRACT

A magnetic recording disk cartridge comprises a flexible recording disk having a cylindrical hub secured to the central portion thereof, and a casing in which the recording disk is accommodated. The cartridge is provided with a locking member comprising a pair of resilient arms which are fixed to the casing and are urged toward each other to grip therebetween the hub to fix the recording disk with respect to the casing so that the surfaces of the recording disk are not brought into contact with the inner surface of the casing, and a releasing member movable between an inoperative position in which it is operatively removed from the resilient arms and an operative position in which it urges the resilient arms away from the hub to release the recording disk from the locking member. The releasing member is arranged to be automatically moved to the operative position when the cartridge is loaded in a system using it, e.g., an electronic camera.

6 Claims, 5 Drawing Figures

MAGNETIC RECORDING DISK CARTRIDGE WITH LOCKING MEMBER

BACKGROUND OF THE INVENTION

1. Field of the Invention

This invention relates to a magnetic recording disk cartridge, and more particularly to a magnetic recording disk cartridge for a magnetic recording disk which is small in diameter and extremely thin in thickness and which is rotated at a high speed for recording or reproduction.

2. Description of the Prior Art

There has come into wide use as a recording medium for an electronic computer a floppy disk which is a flexible disk of polyester resin coated with magnetic material on the both sides thereof and on which digital information is recorded by a magnetic head. The floppy disk is easy to handle and inexpensive.

Recently, there has been proposed a photographic still camera in which, instead of a conventional silver salt photographic film which cannot be reused, a magnetic recording disk smaller than the floppy disk both in thickness and diameter is used as a recording medium. This stilll camera is generally referred to as "an electronic camera". This electronic camera is generally as large as a typical 35 mm photographic camera. In the electronic camera the image of an object is magnetically recorded on the magnetic recording disk while the disk is rotated at a high speed. Generally the magnetic recording disk for the electronic camera is accommodated in a hard casing to form a cartridge and is loaded in the camera body together with the casing.

Though in the conventional floppy disk, the disk is provided with an engaging hole at its center to be supported on its both side, the recording disk for the electronic camera is provided with a hub at its center, the hub being adapted to be engaged with a rotational shaft inserted into the cartridge from one side thereof.

In recording images using a magnetic recording medium, signals are densely recorded on the magnetic recording medium, because video signals have a wider frequency band compared with digital signals or audio signals. Accordingly, when fine unevenness, scratches or flaking exists in the magnetic coating on the magnetic recording medium, so-called drop-out occurs during reproduction and the recorded signals cannot be faithfully reproduced. Because magnetic recording disk cartridge for the electronic camera is frequently used outside, it is normally subjected to vibrations while carried and the surface of the magnetic coating on the recording disk is apt to be brought into contact with the inner surface of the hard casing to be scratched thereby.

SUMMARY OF THE INVENTION

In view of the foregoing observations and description, the primary object of the present invention is to provide a magnetic recording disk cartridge in which the surfaces of the recording disk are prevented from being brought into contact with the inner surface of the casing to be scratched thereby while the cartridge is subjected to vibrations.

The magnetic recording disk cartridge of the present invention is characterized by having a locking member comprising a pair of resilient arms which are fixed to the casing and are urged toward each other to grip therebetween said hub to fix the recording disk with respect to the casing so that the surfaces of the recording disk are not brought into contact with the inner surface of the casing, and a releasing member movable between an inoperative position in which it is operatively removed from the resilient arms and an operative position in which it urges the resilient arms away from the hub to release the recording disk from the locking member.

In a preferred embodiment of the present invention, the releasing member is arranged to be automatically moved to the operative position to release the disk from the locking member when the cartridge is loaded in an electronic camera, for example.

DESCRIPTION OF THE PREFERRED EMBODIMENT

Figure 1:
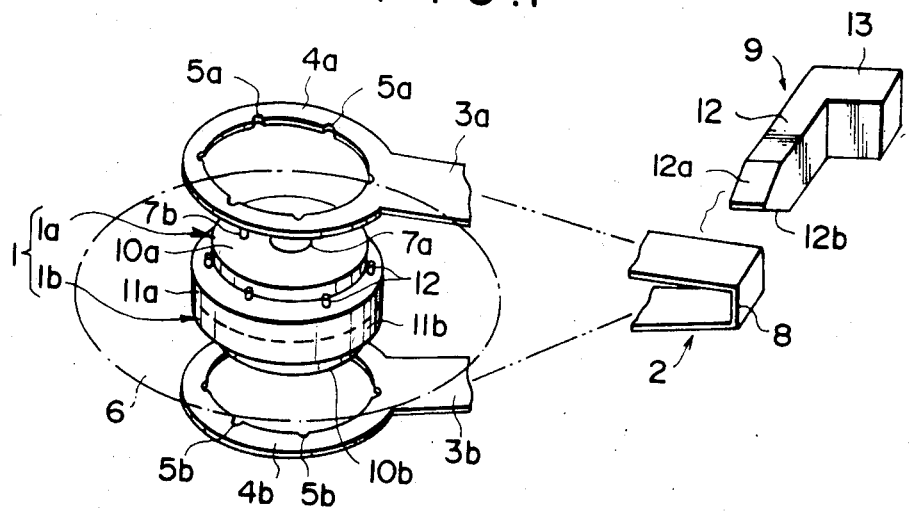
FIG. 1 is an exploded perspective view showing the inner components of a magnetic recording disk cartridge in accordance with an embodiment of the present invention.
Figure 2:
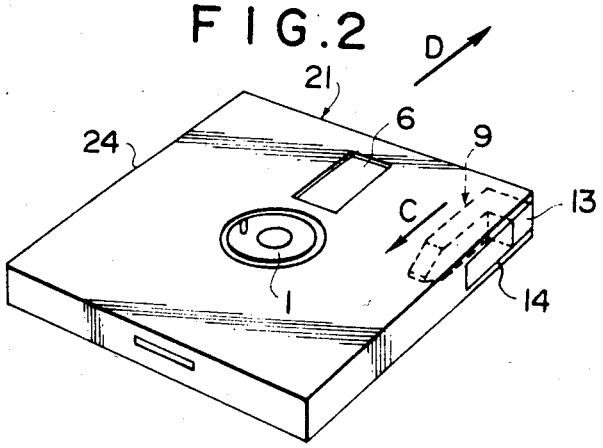
FIG. 2 is a perspective view showing an external appearance of the magnetic recording disk cartridge.

As shown in FIGS. 1 and 2, a magnetic recording disk cartridge 21 in accordance with an embodiment of the present invention includes a substantially rectangular hard casing 24 and flexible magnetic recording disk 6 accommodated therein. A cylindrical hub 1 is secured to the central portion of the recording disk 6. The hub 1 comprises a pair of halves 1a and 1b opposed to each other sandwiching the central portion of the recording disk 6 therebetween. A locking member 2 fixes the hub 1 and accordingly the disk 6 with respect to the casing 24 and a releasing member 9 release the hub 1 from the locking member 2 as will be described in more detail hereinbelow. The hub halves 1a and 1b respectively comprise outer small diameter portions 10a and 10b and inner large diameter portions 11a and 11b. On the free end surface of the small diameter portion 11a of the hub half 1a are provided engaging holes 7a and 7b which are adapted to engage with a driving shaft (not shown) and a projection formed on the driving shaft provided in an electronic camera or a reproducing system to rotate the magnetic recording disk 6 at a high speed. A plurality of projections 12 are formed on annular shoulder surfaces on the large diameter portion 11a and 11b, the projections being arranged along the outer periphery of the small diameter portions 10a and 10b. The locking member 2 is substantially V-shaped and comprises a pair of arms 3a and 3b connected with each other at a bight portion 8. The locking member 2 is fixed to the inner surface of the casing 24 at the bight portion 8. On the free end portions of the respective arms 3a and 3b are formed ring-like portions 4a and 4b. The ring-like portions 4a and 4b have an opening the diameter of which is slightly larger than the diameter of the small diameter portions 10a and 10b and is smaller than the diameter of the large diameter portions 11a and 11b. The ring-like portion 4a and 4b are provided with a plurality of notches 5a and 5b, respectively, on the inner periphery thereof. The ring-like portions 4a and 4b are normally urged toward each other by resilient force of the arms 3a and 3b and grip therebetween the hub 1 to secure the hub 1 and accordingly the magnetic recording disk 6 with respect to the casing 24 with the notches 5a and 5b engaged with the projections 12. Rotational movement and sliding movement of the recording disk 6 are prevented by the engagement of the projections and the notches. The locking member 2 is generally made of metal to give resiliency to the arms 3a and 3b for urging the ring-like portions 4a and 4b toward each other.

Figure 3:
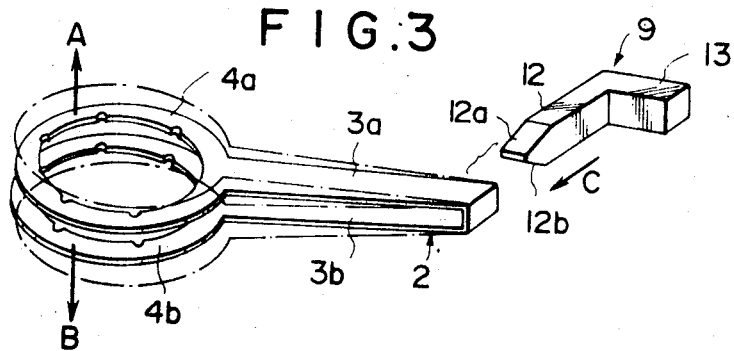
FIG. 3 is a schematic perspective view illustrating the operation of the locking member and the releasing member employed in the embodiment shown in FIGS. 1 and 2.
Figure 4:
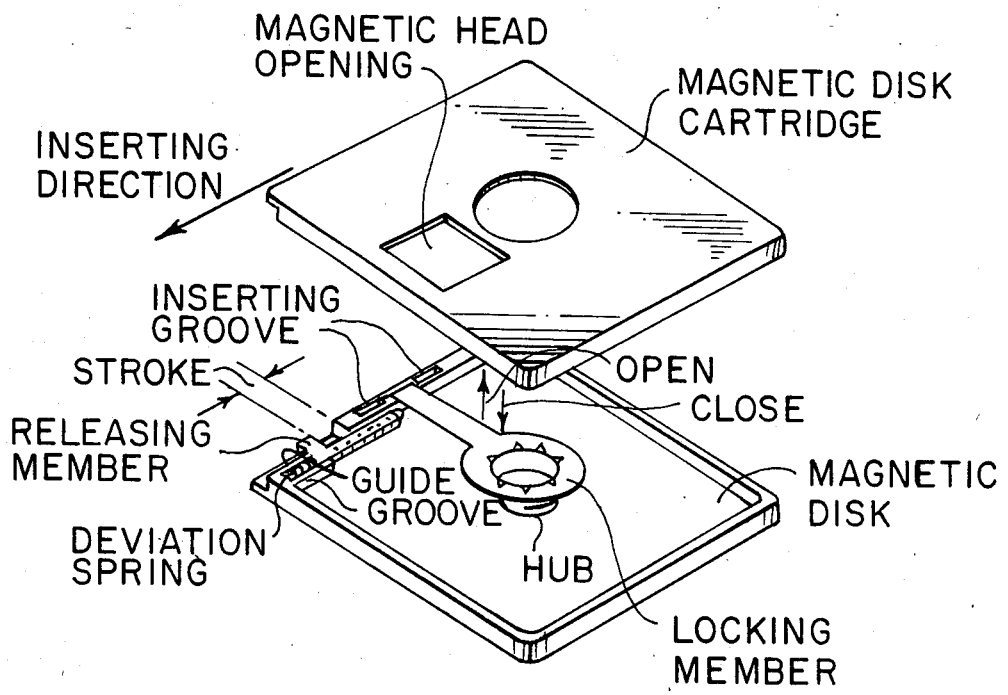
FIG. 4 is an exploded view of the cartridge of FIGS. 1 and 2.
Figure 4:
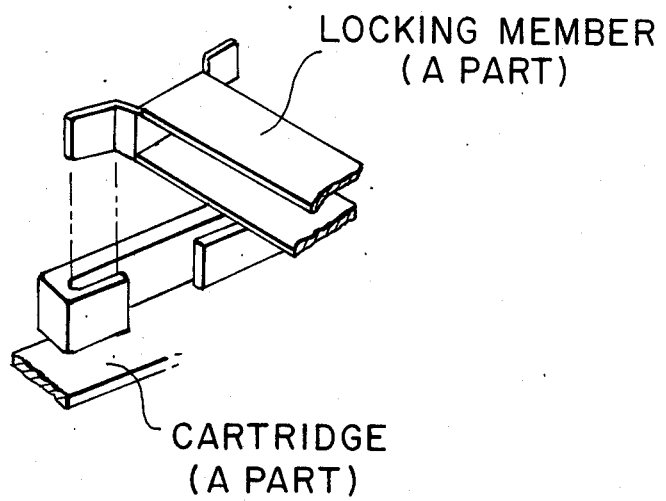
Figure 5:
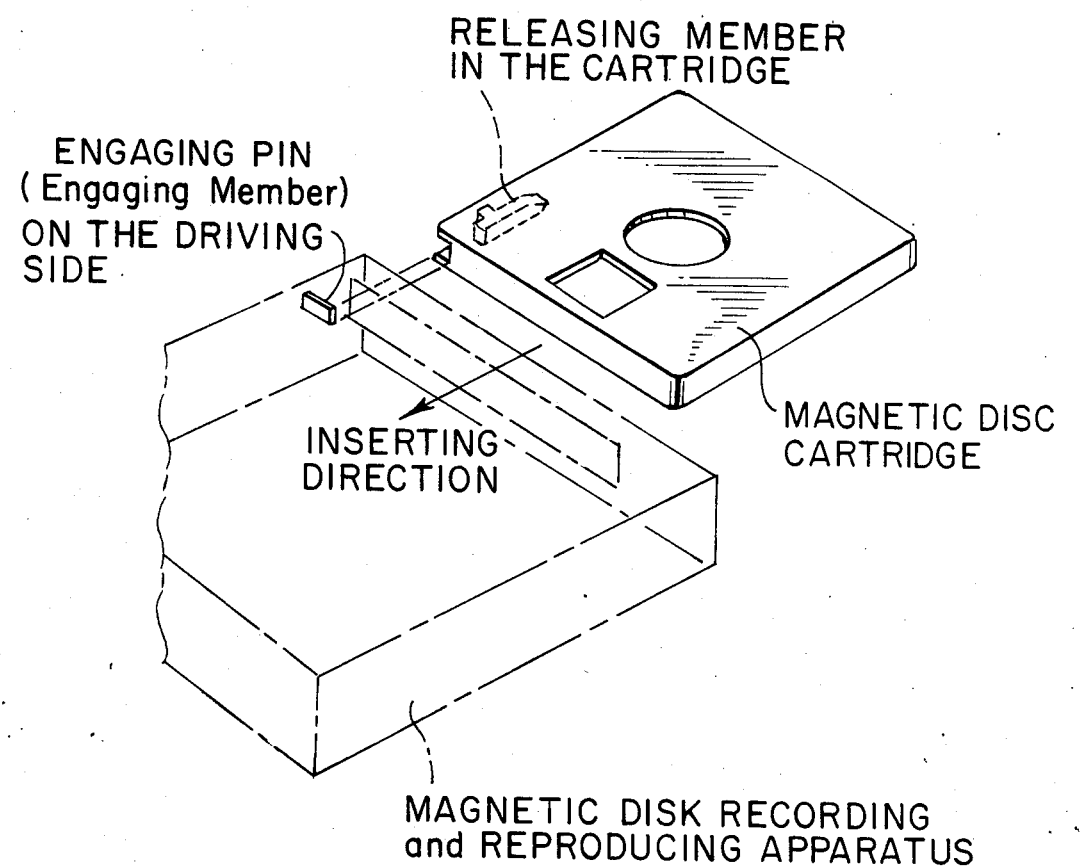
FIG. 5 is a view of the magentic disc cartridge of FIG. 4 and a recording and reproducing apparatus.

The releasing member 9 is substantially L-shaped and comprises a first arm 12 and a second arm 13. The free end portion of the first arm 12 is tapered toward the free end to form a pair of inclined surfaces 12a and 12b. As shown in FIG. 2, the releasing member 9 is mounted in the casing 24 to be movable back and forth in the direction of the arrow C. The second arm 13 of the releasing member 9 projects into an opening 14 formed in one side wall of the casing 24 to give access to the second arm 13 to an engaging member (not shown) provided in a system in which the cartridge 21 is loaded. When the cartridge 21 is loaded in the system, being moved in the direction of the arrow D, the second arm 13 of the releasing member 9 is engaged with the engaging member in the system whereby the releasing member 9 is pushed in the direction of the arrow C. When the releasing member 9 is slid in the direction of the arrow C, the inclined surfaces 12a and 12b of the first arm 12 are forced into between the arms 3a and 3b of the locking member 2 to move the arms 3a and 3b away from each other, whereby the ring-like portion 4a on the arm 3a is moved upward in the direction of the arrow A (FIG. 3) away from the hub half 1a and the ring-like portion 4b on the arm 3b is moved downward in the direction of the arrow B away from the hub half 1b as shown by a broken line in FIG. 3. Thus the recording disk 6 is automatically released from the locking member 2 by merely inserting the cartridge 21 into the system using it.

When the cartridge 21 is taken out, the releasing member 9 is moved backward by the resilient force of the arms 3a and 3b acting on the inclined surfaces 12a and 12b, whereby the ring-like portions 4a and 4b are again brought into engagement with the hub halves 1a and 1b, respectively, to fix the magnetic recording disk 6 with respect to the casing 24 to prevent the surfaces of the disk 6 from being brought into contact with the inner surface of the casing 24. When the resilient force of the arms 3a and 3b is not sufficient to push the releasing member 9, urging means such as rubber and a spring may be provided to urge the releasing member 9 in the direction opposite to the arrow C.

In the embodiment described above, the movement of the recording disk 6 is restricted through engagement of the projections 12 formed on the shoulder surfaces on the large diameter portion 11a and 11b of the hub 1 with the notches 5a and 5b formed on the inner periphery of the ring-like portions 4a and 4b. However, the movement of the recording disk 6 may be restricted by the friction between the inner surfaces of the ring-like portions 4a and 4b and the shoulder surfaces of the hub halves 1a and 1b. In this case the inner surfaces of the ring portions 4a and 4b and the shoulder surfaces of the hub halves 1a and 1b are preferred to be provided with high frictional material. Alternatively, the movement of the recording disk 6 may be restricted by engagement between a plurality of radial protrusions formed on the inner surfaces of the ring-like portions 4a and 4b and a plurality of similar protrusions formed on the shoulder surfaces of the hub halves 1a and 1b.

What is claimed is:

1. A magnetic recording disk cartridge comprising a flexible recording disk having a cylindrical hub secured to the central portion thereof, and a casing in which the recording disk is accommodated characterized by having a locking member comprising a pair of resilient arm means which are fixed to the casing and are urged toward each other by the resilient force of the pair of arm means to grip therebetween said hub to fix the recording disk with respect to the casing so that the surfaces of the recording disk are not brought into contact with the inner surface of the casing, and a releasing member movable between an inoperative position in which it is operatively removed from the pair of resilient arm means and an operative position in which it urges the pair of resilient arm means away from the hub to release the recording disk from the locking member.

2. A magnetic recording disk cartridge as defined in claim 1 in which said pair of resilient arm means are connected with each other at their ends remote from the hub by a bight portion.

3. A magnetic recording disk cartridge as defined in claim 2 in which said releasing member includes a tapered free end portion forming a pair of inclined surfaces, and the tapered free end portion is forced into between the pair of resilient arm means near the bight portion when the releasing member is moved to said operative position, so that the inclined surfaces are respectively engaged with the inner sides of the pair of resilient arm means to push the pair of arm means outwardly.

4. A magnetic recording disk cartridge as defined in claim 3 in which said releasing member is arranged to be moved to the operative position pushed by an engaging means provided in a system using the magnetic recording disk cartridge when it is loaded in the system.

5. A magnetic recording disk cartridge as defined in claim 1, 2, 3 or 4 in which said hub comprises a large diameter portion in the intermediate portion and a pair of small diameter portions on opposite ends of the large diameter portion forming shoulder surfaces between the small diameter portions and the large diameter portion, and each resilient arm means is provided with a ring-like portion at the free end thereof, the ring-like portion having an opening the diameter of which is larger than the diameter of the small diameter portion but smaller than the diameter of the larger diameter portion and the ring-like portions of the respective resilient arm means are adapted to be engaged with the shoulder surfaces on opposite ends of the large diameter portion of the hub to grip the hub.

6. A magnetic recording disk cartridge as defined in claim 5 in which said shoulder surfaces on the large diameter portion are provided with a plurality of projections which are adapted to be engaged with a plurality of notches formed on the inner periphery of the ring portions, when the hub is gripped between the pair of resilient arm means.

* * * * *